United States Patent [19]

Tanaka et al.

[11] 4,072,422
[45] Feb. 7, 1978

[54] APPARATUS FOR INTERFEROMETRICALLY MEASURING THE PHYSICAL PROPERTIES OF TEST OBJECT

[75] Inventors: Nobuyoshi Tanaka, Yokohama; Mitsuo Takeda, Kawasaki; Kazuya Matsumoto, Yokohama, all of Japan

[73] Assignee: Canon Kabushiki Kaisha, Tokyo, Japan

[21] Appl. No.: 734,245

[22] Filed: Oct. 20, 1976

[30] Foreign Application Priority Data

Oct. 27, 1975 Japan .................................. 50-129105
Oct. 27, 1975 Japan .................................. 50-129106

[51] Int. Cl.² ............................................... G01B 9/02
[52] U.S. Cl. ........................................ 356/108; 350/14
[58] Field of Search ............................... 356/106–113; 350/14

[56] References Cited

U.S. PATENT DOCUMENTS

| | | | |
|---|---|---|---|
| 2,518,647 | 8/1950 | Teeple et al. | 356/108 |
| 2,578,859 | 12/1951 | Teeple et al. | 356/108 |
| 2,655,073 | 10/1953 | Strickler et al. | 356/108 |
| 3,319,515 | 5/1967 | Flournoy | 356/108 |

*Primary Examiner*—Conrad J. Clark
*Attorney, Agent, or Firm*—Fitzpatrick, Cella, Harper & Scinto

[57] ABSTRACT

This disclosure describes an apparatus for interferometrically measuring the physical properties of test object in which a test object having at least two surfaces and a substantial thickness is illuminated by a source of broadband light beam, each of plural wave fronts then formed and having an optical path difference therebetween is split by the transmission of the light beam or by the reflection of the light beam thereby, the split wave fronts are superposed each other respectively to form broadband light interference fringes and the physical properties such as thickness and refractive index of the test object are measured from the broadband light interference fringes, and which is especially provided with means for forming broadband light interference fringe by superposing the split wave fronts tilted to each other, while forming an image of said test object in the position where said interference fringe is formed.

9 Claims, 9 Drawing Figures

APPARATUS FOR INTERFEROMETRICALLY MEASURING THE PHYSICAL PROPERTIES OF TEST OBJECT

BACKGROUND OF THE INVENTION

1. Field of the Invention

This present invention relates to apparatus for interferometrically measuring the physical properties such as thickness and refractive index of a light-transmissive test object.

2. Description of the Prior Art

A apparatus for interferometrically measuring optical phase is disclosed in U.S. Pat. No. 2,518,647 issued on Aug. 15, 1950. This U.S. Patent shows a technique wherein the wave fronts coming from both sides of a film illuminated by a source of white light are respectively directed to an interferometer comprising a tilted translucent surface and an untilted reflecting surface, so that each of the two wave fronts from the film is amplitude-split by the tilted translucent surface and the other two wave fronts split by the reflection are tilted and directed to an interference surface, while the two wave fronts split by the transmission are reflected by the untilted reflecting surface and directed to the interference surface, whereby white interference patterns are formed on the interference surface. Then the film thickness is measured from the difference in length of optical path between the positions whereat the mutually intensifying interference patterns are formed. Similar methods of measurement are known from U.S. Pat. Nos. 2,578,859 and 2,655,073. All these are of the type in which the measurement of film thickness is effected from the difference in length of optical path between the positions whereat the mutually intensifying interference patterns are formed.

With the prior art apparatus as mentioned above, the physical properties such as thickness and refractive index of a test object such as synthetic resin film, optical thin layer vapor-deposited or coated on a suitable substrate and gap or spacing between two glass plates can be measured accurately by a non-contact- and non-destructive method. However, it is difficult to simply or directly ascertain, during measurement, which portion of the two dimensional test object corresponds to the data resulted from the measurement. In other words, it is difficult to ascertain, while observing the formed interference fringe, which portions of the test object corresponds to said interference fringe. Therefore, it is also difficult to correlate the distribution of the measured physical properties in the two dimensional test object with the extensive area of the measured test object in a simple and direct manner.

SUMMARY OF THE INVENTION

Accordingly, it is the primary object of the present invention to provide an apparatus for measuring the physical properties of a two dimensional, light transmissive test object by making use of interference of broadband light, which makes it possible in a simple and direct manner to ascertain which portion of the test object is being measured.

Another object of the present invention is to provide an apparatus for measuring the physical properties of a two dimensional, light transmissive test object by making use of interference of broadband light, which allows to observe the distribution of the physical properties in the test object while correlating the distribution with the two dimensional expansion of the test object.

Other objects and aspects of the invention will become apparent from the following detailed description of the invention.

In summary, the apparatus according to the present invention is characterized in that a test object is illuminated by a source of broadband light, — said test object having at least two surfaces including a first partially light reflective and partially light transmissive surface and a second at least partially light reflective surface between which two surfaces the propagation of light is possible — so as to form first and second wave fronts having an optical path difference therebetween corresponding to the optical path between said first and second surfaces and that said first wave front is split into third and fourth wave fronts tilted each other and said second wave front is split into fifth and sixth wave fronts tilted to each other, and further that a broadband light interference fringe is formed by the interference of said third wave front with said fourth and sixth and the interference of said fifth wave front with said fourth and fifth while forming an image of the test object at the position where said interference fringe is formed.

In this specification, the term "broadband light" means a light composed of plural light components having different wave lengths or a light having a spectral distribution continuously changing from one wave length to another. One example of such light is white light emitted from a tungsten-filament lamp or the sun. The term "broadband light interference fringe" used in the specification means an interference fringe which is formed by the superposition of wave fronts of plural broadband lights having an optical path difference therebetween. A typical example of it is white light interference fringe.

DESCRIPTION OF THE PREFERRED EMBODIMENT

Figure 1:
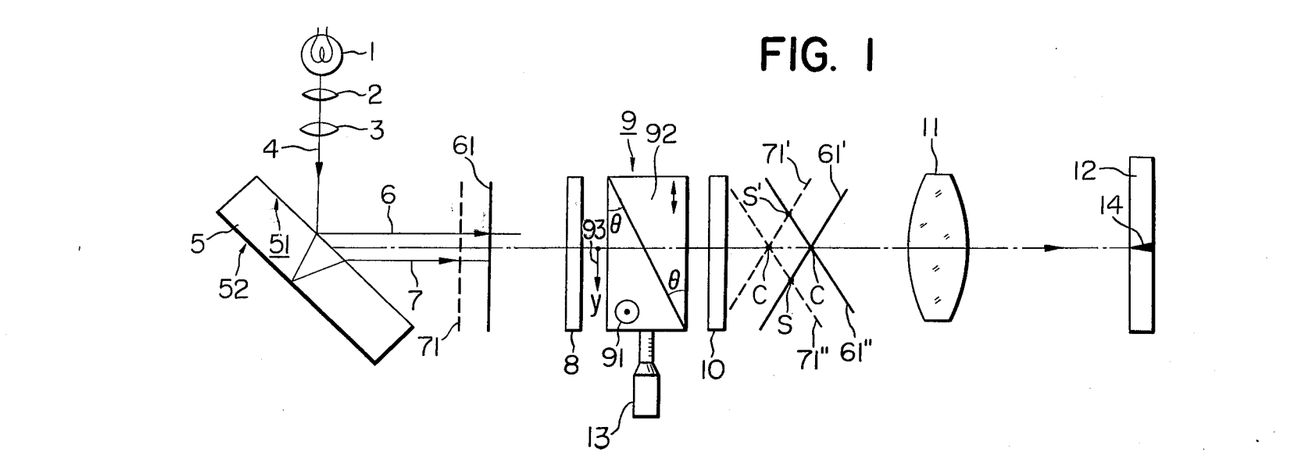
FIG. 1 is a schematic view of an interferometer using a double-image prism.
Figure 2:
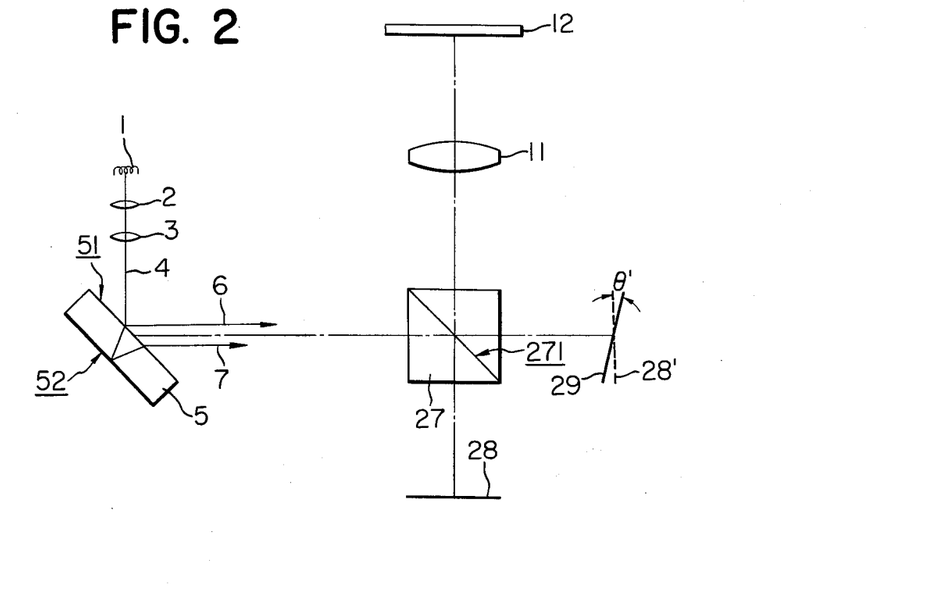
FIG. 2 is a schematic view of a modified Mickelson's interferometer.

Prior to beginning the explanation of the apparatus embodying the present invention, some examples of interferometer useful for the apparatus are described referring to FIGS. 1 and 2, which will assist in understanding of the present invention.

Referring now in particular to FIG. 1, reference numeral 1 designates a source of broadband light. For the present invention, while light is conveniently used as broadband light except the case where its use is unfavourable because of any possible adverse effect on the test object and on the measurement. Hereinafter, therefore, the light source 1 means a source of white light unless any other source is particularly mentioned.

The white light emitted from the light source 1 is converted into a parallel light beam 4 through a condenser lens 2 and a collimator lens 3, and then directed to a transparent test object 5 which is, for example, a piece of glass plate. (Here, we consider that the thickness of the test object is $d$ and its refractive index is $n$.) One portion of the parallel light beam 4 is reflected by the first surface 51 to form a light beam 6 and another portion is first passed through the first surface, then reflected by the second surface 54 and finally passed through again said first surface to form a light beam 7. For the purpose of clarification of the drawing and convenience of the explanation, a wave front 61 is shown in the drawing to represent the light beam 6 and a wave front 71 is shown as a representative of the light beam 7. The wave front 71 lies in the position where its optical path measured from the light source 1 has the same length as that of the wave front 61. Here, assuming that the angle of incidence of the light beam upon the second surface 52 of the test object 5 is $\phi$, there will exist an optical path difference of $2nd \cos \phi$ between the wave fronts 61 and 71.

In the optical path along which the wave fronts are running, there are interposed a polarizer 8, a Wollaston prism 9 and an analyzer 10. These elements 8, 9 and 10 together constitute an interference fringe forming part. Wollaston prism is a prism made of double refractive material such as quarz and calcite. Two triangular prisms 91 and 92 having the same vertical angle $\theta$ are bonded together in such manner that the light incidence surface of the Wollaston prism formed by the two prisms extends parallel to the light exit surface thereof. The polarizer 8 is so arranged that the direction of polarization forms an angle of 45° relative to the optical axis of the prisms 91 and 92. The analizer 10 is so arranged that it becomes parallel nicol or crossed nicol relative to said polarizer 8.

By this Wollaston prism 91, the wave front 61 is split into wave fronts 61' and 61" tilted to each other and the wave front 71 is split into wave fronts 71' and 72" tilted to each other. Here, supposing, on the plane of the drawing, a coordinate the origin of which lies in the position where the thickness of the prism 91 equals that of prism 92 and its y-axis extending normal to the optical axis of the optical system (see the reference numeral 93), then we can obtain the following formula for the optical path differences between the wave fronts 61' and 61" and between the wave fronts 71' and 71":

$$2(Ne - No) \cdot y \cdot \tan \theta$$

In the above formula, $No$ is refractive index of the double refractive material for ordinary ray, and $Ne$ is refractive index of the same for extraordinary ray.

The interference between the two wave fronts 61' and 61" and that between the two wave fronts 71' and 71" occur at the point of $y=0$, that is, point C shown in the drawing, and bring forth a center peak of white light interference fringe. In a similar manner, the interference between the wave fronts 61' and 71" occurs at the point S and that between the wave front 61" and 71' occurs at the point S'. These interferences turn out as side peaks in the interference fringe. Each of the points S and S' will be found at a point where the approximate formula, $2nd \cos\phi \div 2(Ne-No) \cdot y \cdot \tan\theta$ is satisfied. In other words, the point S lies in a position where the optical path difference between the wave fronts 61' and 61" equals that between 61' and 71' and the point S' is a position where the optical path difference between the wave fronts 61" and 61' is equal to that between 61" and 71". Therefore, as seen from the above mentioned relation, the side peaks come out at a point of:

$$Y = nd \cos\phi/(Ne - No) \tan \theta$$

When the polarizer 10 and the analizer 9 are in the relation of parallel nicol, a bright fringe is obtained in the above said peak positions, whereas, when in crossed nicol, dark fringe is obtained.

Figure 3:
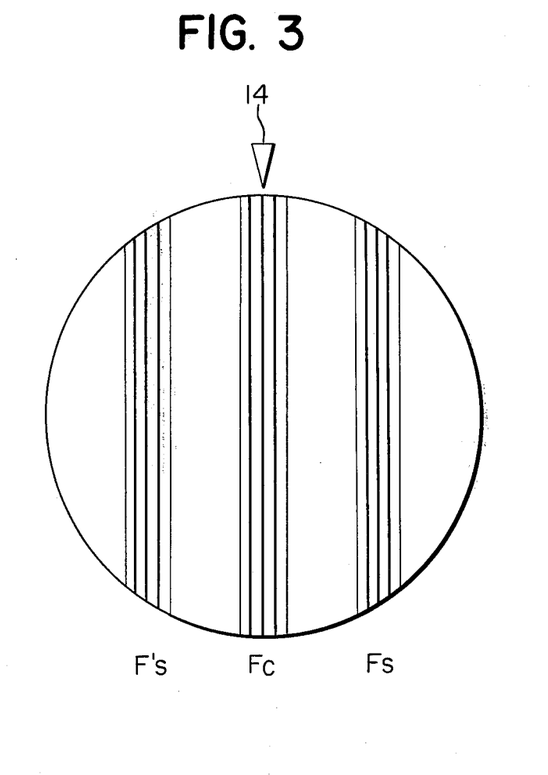
FIG. 3 is a schematic view of white light interference fringes.

For convenience's sake, the drawing of FIG. 1 shows the white light interference fringe as if it were formed outside of the prism 9. But, in practice, the interference fringe is formed in the Wollaston prism 9 itself. Of course, it is possible to view the infringe in the prism 9 as such. However, according to the arrangement of FIG. 1, the white light interference fringe is projected upon a screen 12 through a projection lens 11. The pattern of the interference fring projectedon the screen is shown in FIG. 3. The distance from the center peak Fc to each of the side peak Fs and F's is a function of the thickness $d$ and refractive index $n$ of the test object as mentioned above.

Although the interferometer is shown in FIG. 1 as one which comprises a Wollaston prism, another suitable prism such as Rochon prism also may be used. Furthermore, the Wollaston prism shown in FIG. 1 can be modified to form one of Nomarski type, which also may be used. Usually such prism that splits a light beam into normal ray and extraordinary ray is called double-image prism. In any case, the light beam incident to the double-image prism should, but preferable, be parallel light beam or a light beam having a small angle of divergence. If so, it is allowed to observe the white light interference fringe with its maximum visibility.

As mentioned above, in the interferometer shown in FIG. 1, use is made of a double-image prism to obtain a white interference fringe having plural peaks. This type of interferometer has the advantage of simplicity in structure and easiness in adjustment. However, if it is desired to obtain the interference fringe by an amplitude split of a light beam coming from the test object, another type of interferometer also may be used. To this end, for example, use is made of a modified Michelson's interferometer. But, in this case, the construction becomes more complex and the adjustment is never so easy.

Referring to FIG. 2, one example of such modification of interferometer is shown, in which measurement is made by using a light beam reflected by a test object. Again a test object 5 is illuminated by a parallel light beam 4 emitted from a white light source 1. A light beam 6 reflected upon the first surface 51 of the test object and a light beam 7 reflected upon the second surface 52 are split by the translucent surface 271 of a beam-splitter 27. Between the wave fronts of the beams 6 and 7, there is an optical path difference. The light beam reflected by the beam-splitter is directed to a mirror 28 and the light beam passing through the beam-splitter is directed to a mirror 29. The light beams reflected by the mirrors 28 and 29 are once more fallen into the beam splitter 27 and then directed to lens 11. In the positions of the mirrors 28 and 29, there comes out a white light interference fringe which is projected through the lens 11 upon a screen 12. In order to obtain a white light interference fringe having plural peaks, one of the mirrors 28 and 29, for example the mirror 29 as shown in FIG. 2 is arranged with inclination of $\theta'$ to an inverted image 28' of the mirror 28 inverted with respect to the translucent surface 271. By this arrangement, the wave fronts to be interfered with each other will be tilted relative to each other and a white light interference fringe having plural peaks as shown in FIG. 3 will be formed. (Assuming that on the plane of the drawing sheet there is given a coordinate, y-axis of which extends parallel to the mirror 28 and the origin of which lies in the position whereat the mirror 28 and above said inverted image 28' intersects, the peaks will come out at the positions of $X=0$ and $X=\pm nd \cos\phi/\tan\theta$ for the arrangement of FIG. 2.)

Both of the interferometers shown in FIGS. 1 and 2 are designed to form white light interference fringes by using light beams reflected by the test object 5. However, also by using light beam transmitted through the test object, a similar white light interference fringe may be formed. In this case, the light source 1 must be moved to a position on the side opposed to the interference fringe forming part relative to the test object 5.

Now preferred embodiments of the invention will be described.

Figure 4:
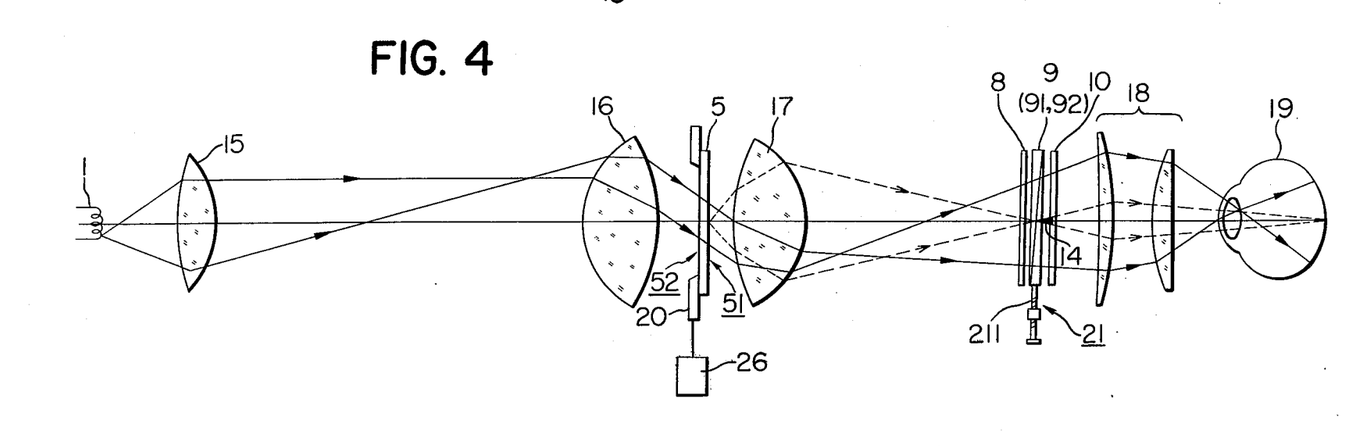
FIG. 4 is a schematic view of an apparatus embodying the present invention.

FIG. 4 shows one embodiment of the invention in which the interference fringe forming part comprising a Wollaston prism described above is incorporated into a Koler illumination types of microscope. In the drawing, reference numeral 15 designates an auxiliary condenser lens and reference numeral 16 designates a condenser lens. The lens 15 focuses the image of a white light source 1 on the focal plane of the condenser lens 16. Accordingly, the image of the light source 1 through the illumination lens system is focused at infinity. A test object 5 is placed on a stage 20 and illuminated, from the second surface side, by the illumination system mentioned above. The solid arrow line in the drawing represents one of the illumination beams. The stage 20 is mechanically connected to conventional positioning means 26. The positioning means comprises a first set of female and male screws and a second set of female and male screws. The first and second female screws are fixed to the stage 20. The second female screw extends to the direction normal to the first male screw. By turning the first and second male screws, various adjustments of the stage 20 can be made with respect to its position in a X – Y coordinate on a plane normal to the plane of the drawing sheet. On the side of the first surface 51 of the test object 5, there is a microscope objective lens 17 which forms a real image of the test object 5. The dotted arrow line in the drawing represents the image forming beam. Through an ocular 18 of the microscope, the observer can view with his eye 19 the image of the test object 5 formed by the lens 17 and magnified by the ocular 18.

As already described, the interference fringe forming part comprises a polarizer 8, a Wollaston prism 9 and an analizer 10. The Wollaston prism 9 is positioned in the manner that the image of the test object 5 by thelens 7 may be formed within the prism 9.

With this arrangement, when the light source is turned on, a white light interference fringe as shown in FIG. 3 is formed in the Wollaston prism. The white light interference fringe corresponds to the distribution of the spacing between the first and second surfaces 51 and 52 and the refractive index of the test object in a plane normal to the plane of the drawing.

(Here it should be noted that in the present embodiment, the white light interference fringe is formed by the beam passed through the second and first surfaces 52 and 51 directly and the beam first passed through the second surface 52, then reflected by the first surface 51 and the second surface 52 and lastly passed through the first surface 51.)

As described above, the image of the test object 5 is focussed in the position where the interference fringe is formed. Therefore, the observer can view, through the ocular 18, not only the image of the test object 5 but also the white light interference fringe appeared in the form of overlap at the same time. The spacing between the center peak and each side peak of the white light interference fringe corresponds to the physical property of the test object 5. Accordingly it becomes possible for the observer to view, while seeing the image of the test object 5, the distribution of its physical property directly on the image.

Figure 5:
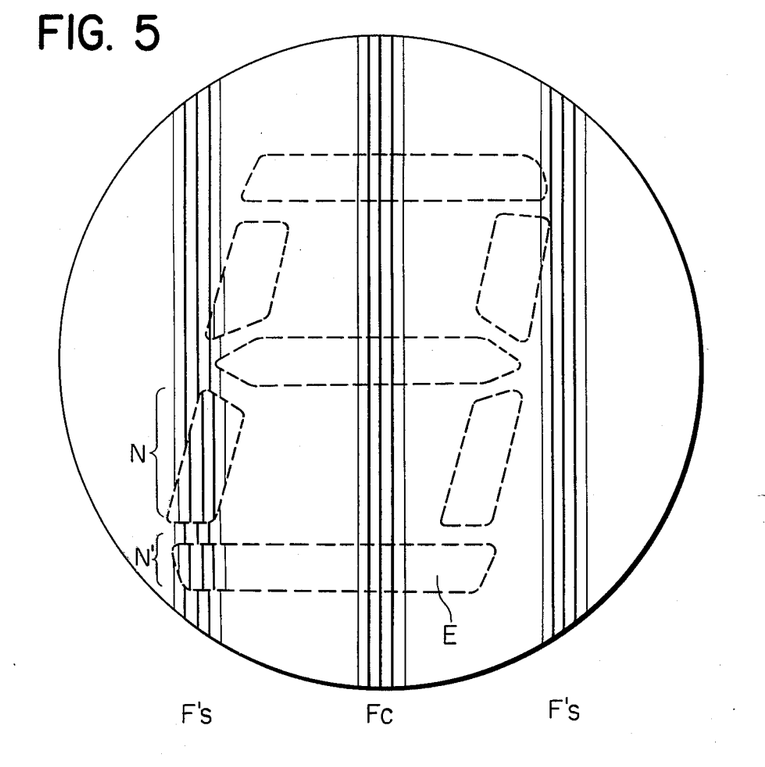
FIG. 5 is a schematic view of the visual field of an ocular as used in the apparatus shown in FIG. 4.

As one example, FIG. 5 illustrates the visual field of the ocular 18 when measurement is effected for the size of a gap between two glass plates adapted to envelop liquid crystal of a digital indication liquid crystal cell. In the drawing, pattern E outlined by broken line is a magnified image of transparent electrode vapor-deposited on the glass plate of the liquid crystal cell. The spacing between the center peak Fc and each of the side Fs and Fs' of the white light interference fringe directly corresponds to the size of the gap between the two glass plates of the liquid crystal cell as well as the infractive index of air in the gap. Therefore, assuming that the infractive index of air is known, the gap size will be given by measuring the spacing between said peaks.

In the left side fringe Fs', there are found two offset portions N and N'. This means that the gap size at these portions is reduced by the thickness of the transparent electrode compared with the remaining portion. In this manner, the distribution of gap (or the distribution of refractive index) in a test object can be viewed on the image of the test object, which is a remarkable advantage of the present invention.

Figure 6:
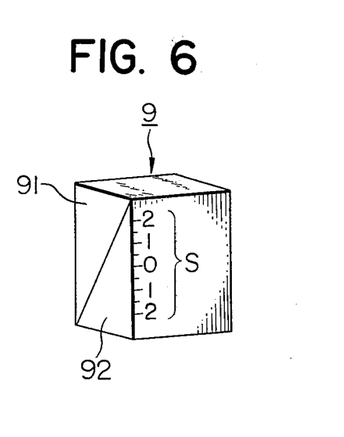
FIGS. 6 to 8 schematically show means for measuring the distance between given peaks of white light interference fringe.

Measurement of the peak spacing may be effected as follows:

In a simple manner, a scale S is calibrated on the light exit surface of Wollaston prism 9, at its area visible through the ocular 18, as illustrated in FIG. 6. By means of the scale S, the spacing between the peaks of a white light interference fringe is measured.

Figure 7:
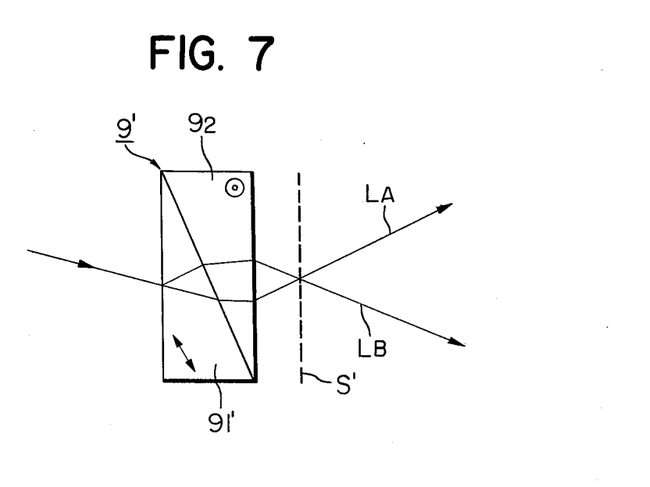

If as a double-image prism, use is made of a Nomarski type of Wollaston prism 9' with the optic axis of its prism 91' being somewhat tilted as shown in FIG. 7, then the scale for measuring the peak spacing should be positioned spaced from the prism 9'. With this arrangement, two light beam $L_A$ and $L_B$ polarization-split by the prism 9' will intersect outside of the prism 9'. Accordingly, a white light interference fringe will be formed at the intersection point. For the reason, a scale S' for measuring the peak spacing is placed in a plane including the intersection point and normal to the plane of the drawing and in a position visible through the ocular 18 (see FIG. 7). In this connection, the Nomarski type of Wollaston prism 9' is so arranged that the image of the test object 5 by the above mentioned lens 17 may be focussed at the point where the two light beams $L_A$ and $L_B$ intersect.

After having measured the spacing between the center peak and the side peak of the white light interference fringe, the resultant value of measurement can be substituted for the mathematical equation described above so as to know the thickness of the object 5 or the refractive index thereof at the measured portion (but provided that one of the thickness and refractive index is known).

In case that test objects are limited to a certain sort of materials and only one of thickness and refractive index should be measured, the scale S or S' may be calibrated to directly indicate the desired thickness or refractive index of the test object.

To measure the peak spacing of a white light interference fringe, there is another possibility which will be described under.

Referring again to the interferometer, for example, of FIG. 1, the Wollaston prism 9 is fixed to the spindle of the micrometer screw 13 and can be moved by turning the sleeve thereof. Here, if the Wollaston prism 9 is moved in the direction parallel to the plane on which a white light interference fringe is formed, namely, in the direction normal to the optic axis of the optical system shown in FIG. 1 and also in the direction which intersects interference fringe at right angle, then the formed interference fringe will be also moved in the same direction and by the same distance (but the image projected upon the screen 12 will be moved in the opposed direction and by such distance that is multipled by magnification of the lens 11). This is ascertainable by changing in the coordinate of the prism 9. As shown in FIG. 2, an indication mark 14 may be affixed to the screen 12 at a suitable point, for example, at the center of the screen. By this arrangement, a white light interference fringe containing information of optical path length in the test object 5 is formed and the micrometer 13 is adjusted. This adjustment may be done, for example, in such manner that at first the center peak Fc is set to the mark 14 and then the Wollaston prism 9 is displaced to the extent that the side peak Fs may arrive at the mark 14. The amount of displacement of the prism 9 during this step is read from the micrometer 13. Here, the amount of displacement is denoted by D. From the mathematical formula described above, it will be understood that the thickness $d$ of the test object may be given by the following equation, provided that the refractive index $n$ of the object is known:

$$d = D (Ne-No) \tan \theta / n \cos \phi$$

On the other hand, if the thickness $d$ is known, the desired refractive index $n$ will be given also by the amount of the Wollaston prism's displacement in the similar manner.

Advantageously, the scale on the micrometer 13 is calibrated to directly indicate the thickness or refractive index of the test object. Even in the case that neither of thickness $d$ and infractive index $n$ is known, it is possible to know both of the desired values by effecting measurement twice under the selection of two different incident angles of the beam to the test object.

Although the interferometer of FIG. 1 is shown as one in which only the Wollaston prism 9 is displaced, but it may be modified to move also the polarizer 8 and the analizer 10 together with the prism 9. Further, it is also possible to make the indication mark 14 movable in such direction that intersects the direction of the interference fringe, while keeping the Wollaston prism 9 in its position. Such movable indication mark may be connected with a micrometer as shown in FIG. 1. With this modification, for example, by adjusting first the mark 14 to the center peak Fc and then moving further the mark by the micrometer until it meets the side peak Fs. The amount of displacement of the mark 14 is readable from the micrometer and, therefore, the thickness or refractive index of the test object is measured.

The above description of means for measuring the peak spacing relates to the interferometer of FIG. 1. However, all of the above are applicable to the apparatus shown in FIG. 4. But, the indication mark 14 should be placed in an appropriate position in the visual field of the ocular 18, for example, at the center of the visual field, but in the vicinity of the light exit surface of the Wollaston prism 9. As to measurement of the displacement of the prism 9, there is another possibility of means for detecting and indicating the amount of the displacement. An explanation of it will be given below.

Referring to FIG. 4, reference numeral 21 designates a screw mechanism which comprises a screw 211 engaged with the Wollaston prism 9. By turning the screw 211, the prism 9 can be moved in the direction mentioned above. According to the arrangement shown in FIG. 8, the Wollaston prism is connected to one end of an arm 22 the other end of which is connected to a slider 231 of a variable resistor 23. To the variable resistor 23, a power source 24 and an ampere meter 25 are connected in series.

Figure 8:
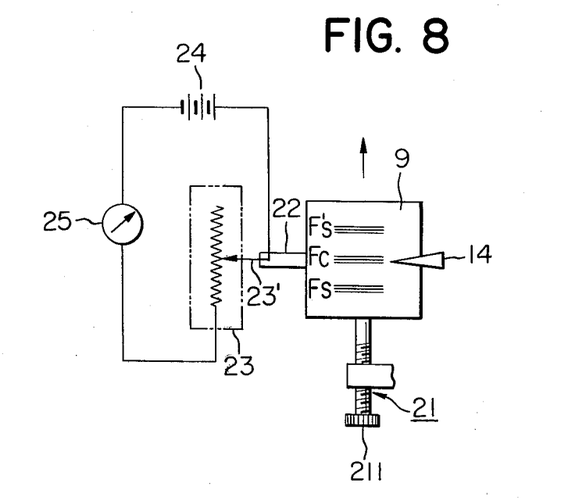

With this arrangement, a white light interference fringe for a given test object is formed at the prism 9, and the position of the prism 9 is adjusted at first using the screw mechanism 21 to make the center fringe Fc adjusted to the mark 14 and secondly by turning the screw 211 to make, for example, the side fringe Fs adjusted to the mark 14. This motion of the prism 9 causes the slider 231 to move at the same time, which in turn brings forth a change in resistance value of the electrical system. Thereby, the value indicated by the ampere meter 25 varies accordingly. Since the amount of change in ampere meter is one to one proportional to the amount of displacement of the prism 9 and, of course, the latter is one to one proportional to the thickness (or infractive index) of the test object, the value indicated by the ampere meter 15 will give the desired thickness (or infractive index, if the thickness is known) of the test object. Advantageously the scale of the ampere meter 25 is calibrated in the unit of thickness or refractive index. Also the ampere meter 25 may be of oscillograph type.

In the above described example, a variable resistor is used to detect the displacement of the Wollaston prism 9. But the variable resistor is only one example. Any type of known electric micrometer may be used for this purpose. Also, any suitable displacement detector known in the art of optoelectronics for digital indication such as MAGNESCALE (trade name), linear encoder and rotary encoder may be used.

Also, in the same manner as that described above regarding the interferometer of FIG. 2, the embodiment of FIG. 4 may be designed to make the mark 14 movable while keeping the Wollaston prism 9 in its position and to measure the physical properties of the test object by means of the displacement of the mark 14.

Furthermore, the embodiment of FIG. 4 in which measurement is effected by using the light beam transmitted through the test object 5, may be modified to effect the measurement by using the light beam reflected by the test object. As to such modification, mention has been made above referring to FIG. 1. As to FIG. 4, such modification may be made by interposing a tilted half mirror in the optical path between the objective 17 and the Wollaston prism 9. Opposed to the half mirror, there is arranged the optical system comprising the white light source 1 and the auxiliary condenser lens 15. The illumination light beam is fallen into the test object 5 through the half mirror and the objective lens 17 (in this case, the objective lens 17 is to perform also a function as a condenser lens for the illumination beam).

Figure 9:
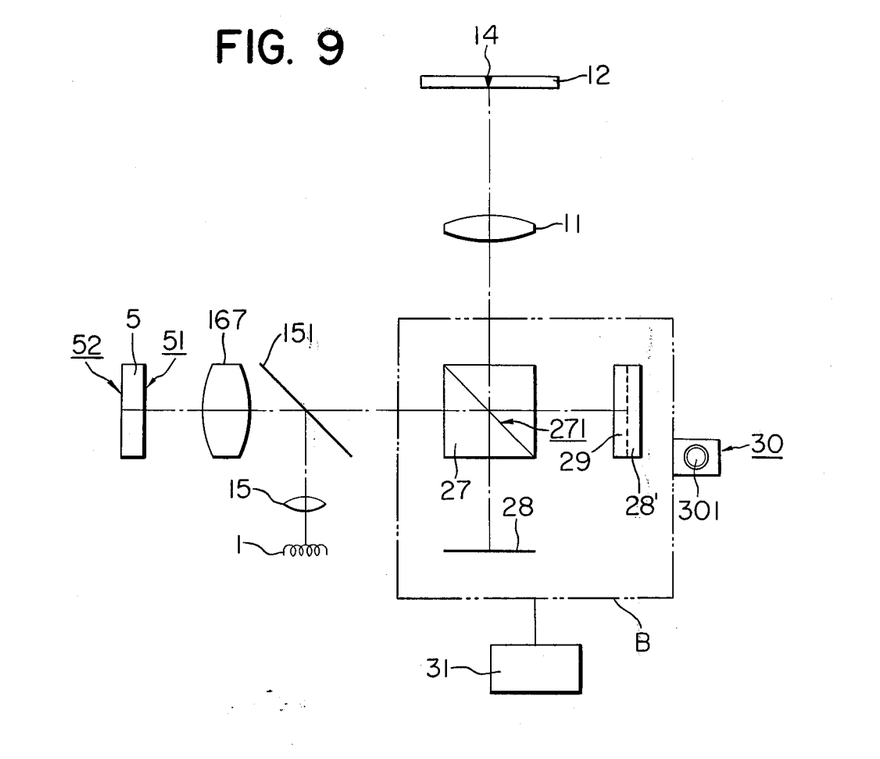
FIG. 9 schematically show another embodiment of the present invention.

The embodiment of FIG. 4 makes use of the principle of the interferometer employing a double-image prism as described above referring to FIG. 1. However, the principle of the modified Michelson's interferometer described above referring to FIG. 2 is also applicable to the present invention. FIG. 9 is given to explain the case. In the drawing of FIG. 9, the test object 5 is illuminated by an illumination system similar to Koler illumination type one. Through the auxiliary condenser lens 15' and the condenser-and-projector lens 167, the image of the white light source is focussed at infinity. Reference numeral 151 designates a tilted half mirror interposed in the light path between the condenser-and-projector lens 167 and the interference fringe forming part comprising the beam splitter 27 and the mirrors 28 and 29 so as to form an illumination light path. In the same manner as that described above referring to FIG. 2, the light beam reflected upon the first surface 51 of the test object 5 and the light beam reflected upon the second surface 52 form white light interference fringes at the mirror 28 and at the mirror 29 respectively. The mirror 29 is inclined with an angle of $\theta$ relative to the inverted image 28' of the mirror 28 in the direction of a plane normal to the plane of the drawing. The lens 167 forms the real image of the test object 5 in the beam splitter 27 in the position where said white light interference fringe is formed. The real image is formed in the positions of the mirrors 28 and 29 by the light beam coming from the test object 5, but refracted by the lens 167 and reflected by the translucent surface 27' of the beam splitter 27, and by the light beam transmitted through the translucent surface of said beam splitter.

The white light interference fringe and the image of the test object are simultaneously projected upon the screen 12 by the projector lens 11. The observer can view both of the image of the test object and the white light interference fringe in an overlapping form. Therefore he can observe the distribution of the physical properties of the object such as thickness and infractive index related to the two dimensional expansion of the object.

In order to measure the peak spacing of the white light interference fringe, means as described referring to FIGS. 1, 4, 6, 7 and 8 is applicable for the purpose. For example, in a suitable position on the screen 12, an indication mark 14 is placed. A box like block B in which the beam splitter 27 and the mirrors 28 and 29 are arranged, is mechanically coupled with a position adjusting means, which may be a screw adjustment mechanism 30 having a screw 301 as shown in FIG. 9. By turning the screw 301, the block B can be moved in such direction that is parallel to the plane on which the white light interference fringe is formed and intersects the interference fringe (more correctly intersects the bright or dark lines of the white light interference fringe). In other words, the direction is a direction of up and down movement normal to the plane of the drawing of FIG. 9. The displacement of the block B is detected by a displacement detecting means 31 which may be an electrical detecting means as shown in FIG. 8. To this end, said detecting means is mechanically connected with the block B. If by means of the screw mechanism 30, the observer adjusts the given peak of the white light interference projected upon the screen to the indication mark 14, then the displacement detecting means 31 will let him know the peak spacing. Once the peak spacing is known, the desired data of physical property of the test object 5 will be given from the above mentioned equation.

As an alternative the indication mark 14 may be made movable in the manner that it can be moved by a position adjusting means such as the screw mechanism 30 and its displacement may be detected by a suitable detecting means such as means shown in FIG. 8.

The arrangement of FIG. 9 is adapted to form a white light interference fringe by using the light beam reflected by the test object 5. However, as shown in FIG. 4, it is possible to modify it so that the white light interference beam may be formed by the beam transmitted through the test object 5. In this case, the arrangement of its illumination system, test object and projector lens 167 will be almost the same as that of FIG. 4.

While there has been described preferred embodiments, in particular, as to the cases where white light is used, obviously and as mentioned above, light other than white light may be used as far as it has some band width of wavelength. All of lights such as those in red, green, yellow and blue range of wave length may be used without prejudice.

Also, while the embodiments has been described particularly in conjunction with the measurement of film thickness, spacing between two glass plates or refractive index, obviously the present invention may be applied for measuring another item. For example, the present invention makes it possible to measure the distribution of unevenness on the surface of an article. For this measurement, on an article having uneven portions distributed thereon such as IC wafer, an optical flat is placed and then the article with the optical flat is located in a predetermined position, for example, in the position of the test object 51 shown in FIG. 4. Thereby a white light interference fringe corresponding to the distribution of unevenness of the article is formed in the position of the Wollaston prism 9. This is because the spacing between the optical flat and said test object varies in accordance with the distribution of unevenness of the object. In this case and also in the above described cases of measuring the spacing between two glass plates, the term "test object" used in the present specification must be understood to means virtually a layer of transparent substance existing between two articles such as a layer of air gap or a layer of vacuum. For the same reason, the term "image of test object" must, in the cases, be understood to mean the image of said layer of substance such as air gap. Generally such layer of substance and two articles between which said layer is sandwiched in are very close to each other. Therefore, according to the present invention, the image of the uneven surface of the article in a position close to the image of the transparent substance layer can be observed overlapping the white light interference fringe. In this manner, a direct observation of the distribution of unevenness is allowed.

The present invention is also useful for adjustment of the spacing between two articles or for parallel alignment of two articles, provided that one is a light transmissive article which can reflect a portion of incident light beam by its surface and the other is a light transmissive article which can reflect at least a portion of incident light beam by its surface or a light reflective article. For example, the adjustment of spacing between two glass plates can be effected in the following manner:

One of the glass plates is placed on a tilting ring base and the other is placed on a up-and-down movable ring base. Then these two ring bases having thereon the glass plates are set on the stage 20 of the microscope shown in FIG. 4. The operator can adjust the spacing between the two glass plates to a predetermined value while observing the white light interference fringe corresponding to said spacing. The adjustment is made by moving the up-and-down movable ring base to the extend that the peak distance related to a given portion of said two glass plates has been adjusted to a predetermined reference value. In a similar manner, while viewing the distribution of the white light interference fringe related to the two dimensional expansion of the glass plates, the operator can change the inclination angle of the tilting ring base so that the distribution may be adjusted to a predetermined reference distribution and, as a result, the angle which said two glass plates form may be adjusted to a predetermined value. Accordingly, a parallel alignment of two glass plates can be effected in a simple manner.

Obviously many modifications and variations of the present invention are possible in the light of the above teachings. Therefore, it is to be understood that the present invention is not limited to the above described preferred embodiments, but may be otherwise variously embodied within the scope of the following claims.

What we claim is:

1. An apparatus for interferometrically measuring the physical properties of a test object having at least two surfaces including a first surface making a portion of incident light reflected and another portion of the light transmitted and a second surface making at least a portion of incident light reflected, said test object being to permit the propagation of the light between said first and second surfaces, which comprises:
   illumination means for illuminating said test object with broadband light so as to form first and second wave fronts having therebetween an optical path difference corresponding to the optical path length between said first and second surfaces of said test object,
   interference fringe forming means for receiving said first and second wave fronts, splitting said first wave front into third and fourth wave fronts tilted to each other and said second wave front into fifth and sixth wave fronts tilted to each other and making said third wave front intersect said fourth and sixth wave fronts and further said fifth wave front intersect said fourth and sixth wave fronts so as to form a broadband light interference fringe,
   image forming means for forming an image of said test object in the position where said broadband light interference fringe is formed by said interference fringe forming means, and
   viewing means for allowing to view the image of said test object and said broadband light interference fringe simultaneously.

2. An apparatus as claimed in claim 1 wherein said viewing means comprises means for measuring the size of a desired portion of said broadband light interference fringe.

3. An apparatus as claimed in claim 1 wherein said viewing means comprises an indication mark and said apparatus further comprises displacing and adjusting means for producing a relative movement between said indication mark and said broadband light interference fringe with respect to the direction intersecting said broadband light interference fringe, and displacement detecting means for detecting the amount of said relative movement.

4. An apparatus as claimed in claim 1 wherein said illumination means illuminates said test object from the side of its second surface and said interference fringe forming means receives such wave front that has transmitted said second surface and said first surface of said test object successively and such wave front that has reflected upon said first surface and said second surface of said test object successively and thereby forms the broadband light interference fringe.

5. An apparatus as claimed in claim 1 wherein said illumination means illuminates said test object from the side of its first surface and said interference fringe forming means receives such wave front that has reflected upon said first surface and such wave front that has reflected upon said second surface of said test object and thereby forms the broadband light interference fringe.

6. An apparatus as claimed in claim 1 wherein said illumination means is provided with a white light source.

7. An apparatus as claimed in claim 1 wherein said interference fringe forming means comprises a polarizer, an analizer and a double-image prism interposed in the light path between said polarizer and said analizer.

8. An apparatus as claimed in claim 7 wherein said double-image prism is a Wollaston prism.

9. An apparatus as claimed in claim 1 wherein said interference fringe forming means comprises a half mirror surface, a first mirror surface optically opposed to said half mirror surface and a second mirror surface located in the position of an inverted image of said first mirror surface inverted with respect to said half mirror surface, said second mirror surface being arranged tilted relative to said inverted image.

* * * * *

UNITED STATES PATENT AND TRADEMARK OFFICE
CERTIFICATE OF CORRECTION

PATENT NO. : 4,072,422
DATED : February 7, 1978
INVENTOR(S) : NOBUYOSHI TANAKA, et al.

It is certified that error appears in the above-identified patent and that said Letters Patent are hereby corrected as shown below:

Column 3, line 60, change "y-0" to -- y=0; line 68, change "2nd $\cos\phi \div 2(Ne-No)\cdot y\cdot\tan\theta$" to read
-- 2nd $\cos\phi \doteq 2(Ne-No)\cdot y\cdot\tan\theta$ --.
Column 10, line 53, change "means virtually" to -- mean virtually --.

*Signed and Sealed this*

*Eleventh* Day of *July 1978*

[SEAL]

*Attest:*

RUTH C. MASON
*Attesting Officer*

DONALD W. BANNER
*Commissioner of Patents and Trademarks*